US008294773B2

(12) United States Patent
Oshino et al.

(10) Patent No.: US 8,294,773 B2
(45) Date of Patent: Oct. 23, 2012

(54) IMAGE CAPTURING APPARATUS AND IMAGE PROCESSING METHOD (75) Inventors: Takahiro Oshino, Utsunomiya (JP); Hidetoshi Tsubaki, Utsunomiya (JP); Mitsuhiro Saito, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 490 days.

(21) Appl. No.: 12/269,375

(22) Filed: Nov. 12, 2008

(65) Prior Publication Data
US 2009/0128700 A1 May 21, 2009

(30) Foreign Application Priority Data

Nov. 16, 2007 (JP) ................................. 2007-298531

(51) Int. Cl.
*H04N 5/228* (2006.01)
(52) U.S. Cl. ...................................... 348/208.6; 396/52
(58) Field of Classification Search ............... 348/208.1, 348/208.2, 208.3, 208.4, 208.6, 208.99; 382/293, 382/294, 295, 296, 298; 396/52, 53, 54, 396/55, 153
See application file for complete search history.

(56) References Cited

U.S. PATENT DOCUMENTS

| | | | |
|---|---|---|---|
| 5,107,293 A | | 4/1992 | Sekine et al. |
| 5,502,482 A | * | 3/1996 | Graham ........................ 348/140 |
| 5,629,988 A | * | 5/1997 | Burt et al. ...................... 382/276 |
| 6,396,961 B1 | * | 5/2002 | Wixson et al. ................. 382/294 |
| 6,628,711 B1 | * | 9/2003 | Mathew et al. ........... 375/240.12 |
| 7,428,003 B2 | * | 9/2008 | Hatanaka et al. ........... 348/208.1 |
| 7,502,052 B2 | * | 3/2009 | Kamoshida .............. 348/208.99 |
| 7,583,858 B2 | * | 9/2009 | Gallagher ..................... 382/296 |
| 7,742,077 B2 | * | 6/2010 | Sablak et al. ............ 348/208.99 |
| 7,834,907 B2 | * | 11/2010 | Kawai ........................ 348/208.4 |
| 2002/0036692 A1 | * | 3/2002 | Okada ............................ 348/208 |
| 2006/0017813 A1 | * | 1/2006 | Okubo et al. ............... 348/208.2 |
| 2007/0002145 A1 | * | 1/2007 | Furukawa ................. 348/207.99 |

FOREIGN PATENT DOCUMENTS

JP        02-075284 A        3/1990

OTHER PUBLICATIONS

M. Irani et al., Recovery of Ego-Motion Using Image Stabilization, 1994, pp. 454-460.

* cited by examiner

*Primary Examiner* — Aung S Moe
*Assistant Examiner* — Chriss Yoder, III
(74) *Attorney, Agent, or Firm* — Carter, DeLuca, Farrell & Schmidt LLP (57) ABSTRACT

An image processing apparatus includes a geometric converter configured to perform a geometric conversion process to a first frame image among frame images that are sequentially generated through imaging, based on motion information obtained by using a motion detector sensor, a motion vector detector configured to detect a motion vector between a geometric conversion image obtained through the geometric conversion process and a second frame image that has not undergone the geometric conversion process, an image stabilization parameter calculator configured to calculate an image stabilization parameter for different motions by using the motion information and the motion vector, and a stabilized image generator configured to generate a stabilized image through a deformation process to the second frame image or a frame image generated subsequent to the second frame image by utilizing the image stabilization parameter.

4 Claims, 9 Drawing Sheets

IMAGE CAPTURING APPARATUS AND IMAGE PROCESSING METHOD

BACKGROUND OF THE INVENTION

Field of the Invention

The present invention relates to an image processing apparatus and method configured to stabilize an image through image processing in an image pickup apparatus.

An image stabilization method that stabilizes an image includes an optical image stabilization method and an electronic image stabilization method. The optical image stabilization method detects a rotational angle of a camera using a motion detection sensor, such as an angular velocity sensor and an acceleration sensor, and displaces a lens in an image pickup optical system and an image pickup device that photoelectrically converts a subject image based on the rotational angle.

On the other hand, one of the electronic image stabilization methods includes a method that detects a motion vector between frame images in a motion picture, changes an output area in each frame image based on the motion vector, and obtains a stabilized motion picture image.

Moreover, Japanese Patent No. 2,941,815 discloses an image stabilization method that provides an image stabilization operation using one of motion information obtained from a motion detection sensor, and a motion vector obtained between the frame images, which one has a higher reliability.

However, the conventional image stabilization method is established as long as a rotational angle of a camera caused by a small vibration, such as a hand vibration, can be approximated to a translational amount in an image in the longitudinal and lateral directions, particularly when an image pickup optical system is set to a telescopic end. Therefore, for example, when the image pickup optical system is set to a wide-angle end and a photographer takes an image while walking, an image stabilization effect is unavailable in a motion that is more complicated and greater than a hand vibration, such as shocks associated with walking and camera's orientation changes.

M. Irani, B. Rousso, S. Peleg, "Recovery of Ego-Motion Using Image Stabilization," International Conference on Computer Vision and Pattern Recognition, pages 454-460, 1994 discloses, as an image stabilization method for large vibrations, a method that estimates rotational information around three axes including camera's rotations around a horizontal direction, a perpendicular direction, and the optical axis based on a motion vector obtained between frame images, and stabilizes an image using the rotational information.

Nevertheless, the rotational information around the three axes disclosed in the above reference has a difficulty of obtaining a sufficient image stabilization effect to complicated vibrations in the longitudinal, lateral, and back-and-forth directions along with walking.

SUMMARY OF THE INVENTION

The present invention is directed to an image processing apparatus and an image processing method which can well stabilize an image in large and complicated motions in an image pickup apparatus.

An image processing apparatus according to one aspect of the present invention includes a geometric converter configured to perform a geometric conversion process to a first frame image among frame images that are sequentially generated through imaging, based on motion information obtained by using a motion detector sensor, a motion vector detector configured to detect a motion vector between a geometric conversion image obtained through the geometric conversion process and a second frame image that has not undergone the geometric conversion process, an image stabilization parameter calculator configured to calculate an image stabilization parameter for different motions by using the motion information and the motion vector, and a stabilized image generator configured to generate a stabilized image through a deformation process to the second frame image or a frame image generated subsequent to the second frame image by utilizing the image stabilization parameter.

An image processing method according to another aspect of the present invention includes the steps of performing a geometric conversion process to a first frame image among frame images that are sequentially generated through imaging, based on motion information obtained by using a motion detector sensor, detecting a motion vector between a geometric conversion image obtained through the geometric conversion process and a second frame image that has not undergone the geometric conversion process, calculating an image stabilization parameter for different motions by using the motion information and the motion vector, and generating a stabilized image through a deformation process to the second frame image or a frame image generated subsequent to the second frame image by utilizing the image stabilization parameter.

Further features of the present invention will become apparent from the following description of exemplary embodiments (with reference to the attached drawings).

DESCRIPTION OF THE EMBODIMENTS

Referring now to the drawings, a description will be given of a preferred embodiment of the present invention.

First Embodiment

Figure 1:
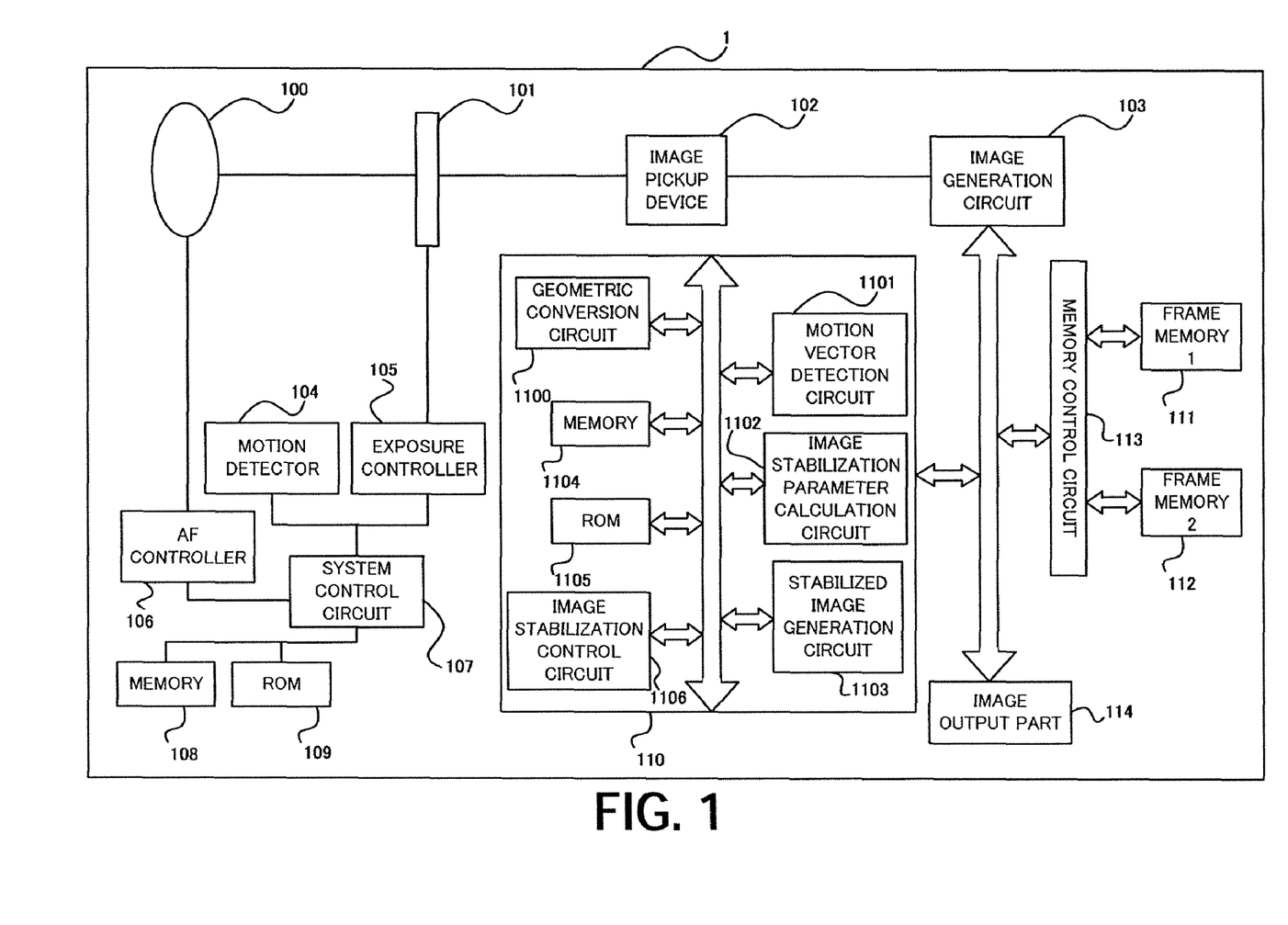
FIG. 1 is a block diagram showing a structure of a camera that includes an image processing apparatus according to a first embodiment of the present invention.

FIG. 1 shows a structure of a camera 1 (an image pickup apparatus or unit) which includes an image processing apparatus according to a first embodiment of the present invention. The camera 1 covers a digital still camera and a video camera. While this embodiment and the following second embodiment discuss a camera integrated with an image pickup lens, the present invention is applicable to a camera of a lens exchange type. In this case, the following motion detector may be mounted on the exchange lens (image pickup unit).

100 denotes an image pickup lens (image pickup optical system), which forms a subject image on an image pickup device 102, such as a CCD sensor and a CMOS sensor. 101 is an exposure control member that includes a stop, a shutter, or the like.

The light incident upon the interior of the camera 1 via the image pickup lens 100 from the subject is controlled in light quantity by the exposure control member 101, and reaches the image pickup device 102. The image pickup device 102 photoelectrically converts the subject image.

103 denotes an image generation circuit that converts an analog output signal from the image pickup device 102 into a digital signal, and generates a motion picture image through a wide variety of image processes to the digital signal, such as an automatic white balance process, and a pixel interpolation process, and a chromatic conversion process. The motion picture image, as used herein, includes a plurality of frame images that are sequentially generated at a predetermined period. The image pickup device 102 and the image generation circuit 103 form an image pickup system.

104 denotes a motion detector (motion detection sensor) configured to detect a motion of the camera 1, which is constituted by a sensor that mechanically or physically detects a motion, such as a gyro sensor (angular velocity sensor) and an acceleration sensor. The motion detector 104 detects a rotational motion of the camera 1, and generates rotational information (motion information) that represents the rotational motion. The rotational motion includes a pitch as a perpendicular rotation, a yaw as a horizontal rotation, and a rotation around the optical axis of the image pickup lens 100. However, the motion detector 104 in the following description detects rotations of the camera 1 around two axes of a pan and a tilt. This is true of the following second embodiment.

105 denotes an exposure controller that controls an operation of the exposure control member 101. 106 denotes an AF controller that controls an operation of a focus lens in the image pickup lens 100. The exposure controller 105 and the AF controller 106 will be controlled, for example, by a TTL method.

107 denotes a system control circuit that governs controls of an operation of the entire camera 1. 108 denotes a memory (ROM) that stores data and a computer program necessary for control of the system control circuit 107. 109 denotes an EEPROM that stores information, such as various adjustment values.

110 denotes an image stabilization circuit (image processing apparatus), and generates a stabilized image as an output image through an image stabilization process to frame images that are sequentially generated by the image generation circuit 103.

111 denotes a frame memory 1 that temporarily stores a predetermined number of frame images generated by the image generation circuit 103. 112 denotes a frame memory 2 that temporarily stores a stabilized image generated by the image stabilization circuit 110. 113 denotes a memory control circuit that controls an image signal that is to be input into and output from the frame memories 111 and 112.

114 denotes an image output part that displays an image generated by the image generation circuit 110, on a display (not shown) or records the image in a recording medium (not shown).

Next follows a description of an internal structure of the image stabilization circuit 110.

1100 denotes a geometric conversion circuit (geometric converter). The geometric conversion circuit 1100 performs a geometric conversion (deformation) process to a previous frame image (first frame image) generated by the image generation circuit 103, based on the rotational information of the camera 1 generated by the motion detector 104. An image obtained through the geometric conversion process to a previous frame image performed by this geometric conversion circuit 1100 will be referred to as a "geometric conversion image" hereinafter.

1101 denotes a motion vector detection circuit (motion vector detector). The motion vector detection circuit 1101 detects a motion vector between the geometric conversion image, and a current frame image (second frame image) that is generated by the image generation circuit 103 after the previous frame image. The motion vector detection method will be described later.

Here, the current frame image may be a frame image next to the previous frame image or continuously generated at a generation period of the frame image, or one or more frame images may exist between the previous frame image and the current frame image. This is true of the following second embodiment.

In the following description, the current frame image is a frame image that continues to or is generated just subsequent to the previous frame image.

1102 denotes an image stabilization parameter calculation circuit (image stabilization parameter calculator). The image stabilization parameter calculation circuit 1102 calculates (estimates) a coordinate conversion parameter corresponding to a motion other than a (rotational) motion detected by the motion detector 104 among plural types of motions that could occur in the camera 1. Moreover, the image stabilization parameter calculation circuit 1102 calculates an image stabilization parameter to different motions by using rotational information and the coordinate conversion parameters obtained by the motion detector 104.

1103 denotes a stabilized image generation circuit (stabilized image generator), which performs a deformation process to a frame image by using an image stabilization parameter calculated by the image stabilization parameter calculation circuit 1102, and generates a stabilized image. Here, a target of the deformation process may be the current frame image or any frame image generated after the current frame image. In the following description, assume that the deformation process is performed for the current frame image.

1104 denotes a memory circuit that temporarily stores image data, and 1105 is a ROM that stores various data necessary for the image stabilization process. 1106 denotes an image stabilization control circuit that controls each circuit in the image stabilization circuit 110, and is constituted by an MPU, etc.

Figure 2:
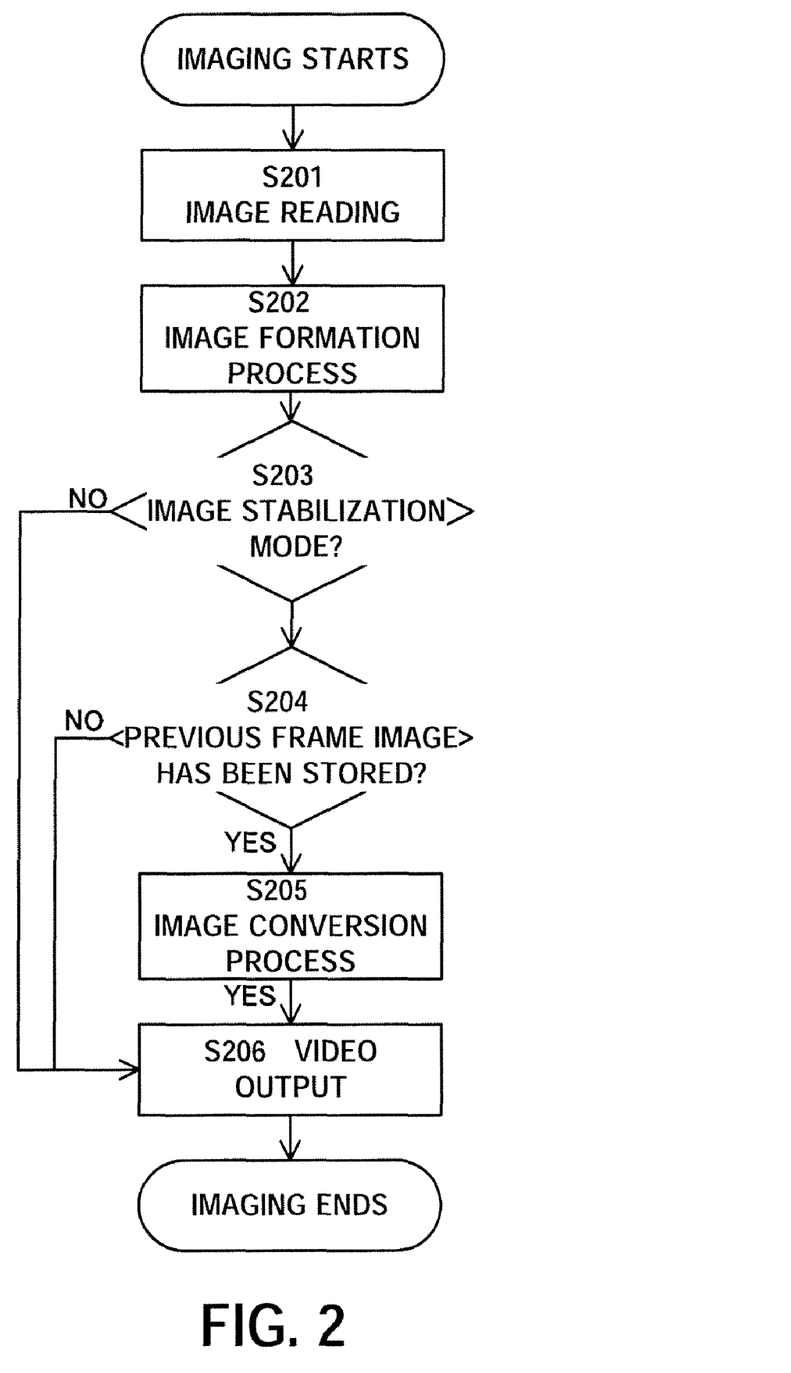
FIG. 2 is a flowchart showing an operation of the camera according to the first embodiment.

Referring now to a flowchart of FIG. 2, a description will be given of an operation of the camera 1. The flowchart of FIG. 2 indicates a flow from taking a subject image to displaying an output image on a display or recording the output image in the recording medium through the image output part 114. This operation is executed by the system control circuit 107 and the image stabilization control circuit 1106 according to the computer program. This is true of the following second embodiment.

When an imaging start button (not shown) is pressed in the step S201, the system control circuit 107 performs photometry and focus detections using a signal from the image pickup device 102, and operates an exposure control member 101 and the focus lens through the exposure controller 105 and the AF controller 106. Thereafter, the system control circuit 107 photoelectrically converts the subject image formed on the image pickup device 102, and generates an analog signal corresponding to the subject image.

In the step S202, the system control circuit 107 performs an image formation process so that the image generation circuit 103 can perform a conversion process of an analog signal generated by the step S201 into a digital signal, and a generation process of a frame image. A predetermined number of frame images that have been thus generated are temporarily stored in the frame memory 111.

In the step S203, the system control circuit 107 determines whether an image stabilization mode to execute the image stabilization process is set. Whether or not the image stabilization mode is set is selected through an IS switch (not shown) by a photographer. When the image stabilization mode is not set, the following step S206 outputs the current frame image that has not undergone the image stabilization process to the image output part 114. When the image stabilization mode is set, the flow proceeds to the step S204.

In the step S204, the system control circuit 107 determines whether the frame memory 111 stores the previous frame image. When the previous frame image is not stored, the step S206 outputs the current frame image that has not undergone the image stabilization process. When the frame image is stored, the flow proceeds to the step S205.

In the step S205, the image stabilization control circuit 1106 performs an image stabilization process (image conversion process) to the current frame image using the previous frame image and the current frame image, and generates a stabilized image. In this case, the step S206 outputs the stabilized image to the image output part 114.

Referring to the flowchart of FIG. 3, a description will be given of the image stabilization process (image process method).

In the step S301, the image stabilization control circuit 1106 obtains rotational information (pan information and tilt information in this embodiment) of the camera 1 detected by the motion detector 104, or a rotational amount (pan angle and tilt angle) R of the camera 1 from time at which the previous frame image is obtained to time at which the current frame image.

When the motion detector 104 includes an angular velocity sensor, the rotational amount R is obtained by integrating an output signal of the angular velocity sensor with respect to a time period between the previous frame image and the current frame image. When the motion detector 104 includes an acceleration sensor, the rotational amount R is obtained by integrating an output signal of the acceleration sensor twice with respect to a time period between the previous frame image and the current frame image. Assume that sensor peculiar noises are corrected in either case.

The rotational information by the motion detector 104 is sequentially generated in synchronization with a generation period of the frame image (a signal readout period from the image pickup device 102), and a plurality of pieces of time rotational information are stored in the memory 108.

Next, in the step S302, the image stabilization control circuit 1106 makes the geometric conversion circuit 1100, the motion vector detection circuit 1101, and the image stabilization parameter calculation used to stabilize a vibration between the previous frame image I(t−1) and the current frame image I(t). A description will be given of the image stabilization parameter calculation process with reference to a flowchart shown in FIG. 4.

Figure 4:
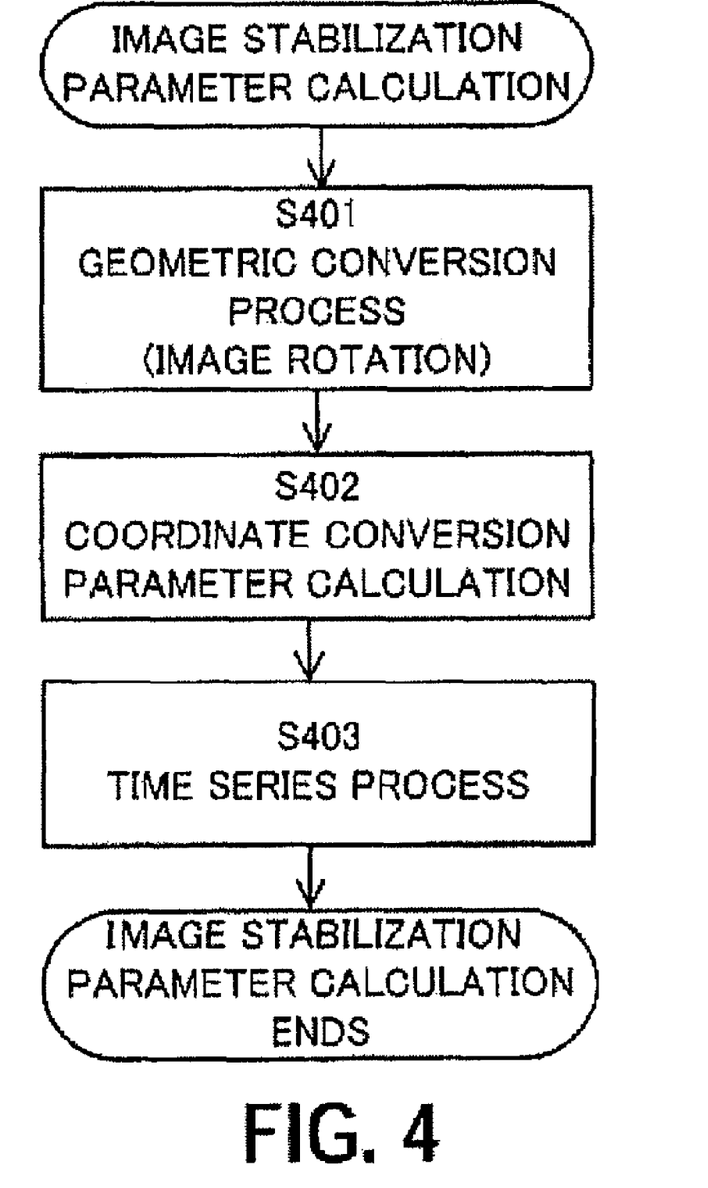
FIG. 4 is a flowchart showing an image stabilization parameter calculation process flow according to the first embodiment.

Initially, in the step S401, the geometric conversion circuit 1100 geometrically convert the previous frame image I(t−1) by using the above rotational amount R and Equation 1, and generates the geometric conversion image I'(t−1).

$$I'(t-1)=RI(t-1) \qquad \text{EQUATION 1}$$

A detailed description of Equation 1 will be described. Equation 2 is a homogeneous coordinate that describes (x, y) that is a pixel coordinate before the geometric conversion (which has an origin at a center of an image corresponding to the optical axis of the image pickup lens 100), and (x', y') that is a pixel coordinate after the geometric conversion:

$$\begin{bmatrix} x' \\ y' \\ 1 \end{bmatrix} = R \begin{bmatrix} x \\ y \\ 1 \end{bmatrix} \qquad \text{EQUATION 2}$$

$$= \begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix}$$

$$\begin{bmatrix} 1 & 0 & 0 \\ 0 & \cos\varphi & \sin\varphi \\ 0 & \sin\varphi & \cos\varphi \end{bmatrix} \begin{bmatrix} x \\ y \\ 1 \end{bmatrix}$$

However, $\phi$, $\Theta$, and $\varphi$ are a rotational angle, a tilt angle, a pan angle around the optical axis, respectively. Since the motion detector 104 of this embodiment detects the pan angle and the tilt angle, a geometric conversion image I'(t−1) is calculated with $\phi=0$.

Next, in the step S402, the motion vector detection circuit 1101 detects a motion vector between the geometric conversion image I' (t−1) calculated by the step S401 and the current frame image I(t) that has not undergone the geometric conversion process. Moreover, the image stabilization parameter calculation circuit 1102 calculates the coordinate conversion parameter (finally the following system representative coordinate conversion parameter) between the geometric conversion image I' (t−1) and the current frame image I(t) based on the motion vector. Here, the coordinate conversion parameter is calculated which relates to a motion other than a motion (such as panning and tilting) corresponding to the rotational amount R obtained by the motion detector 104. In other words, the motion other than the pan and tilt of the camera 1 includes a longitudinal, lateral, and back-and-forth (optical-axis direction) translations and a rotational motion around the optical axis.

This embodiment uses a method disclosed in Japanese Patent Laid-Open No. ("JP") 2005-269419 as a calculation method of a coordinate conversion parameter and a detection method of a motion vector. However, the detection method of the motion vector and the calculation method of the coordinate conversion parameter applicable to the present invention are not limited to this embodiment.

A brief description will now be given of the method disclosed in JP 2005-269419.

Figure 5:
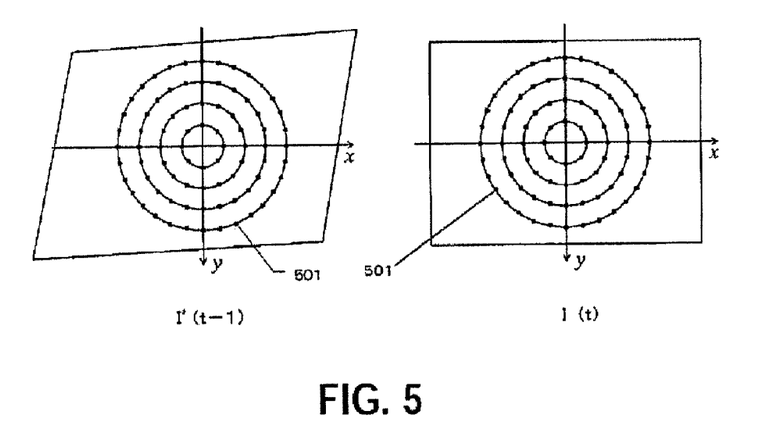
FIG. 5 is a view showing an arrangement illustration of motion-vector detection points between frame images according to the first embodiment.

Initially, a local motion vector is detected between frame images. At this time, for a detection position of the local motion vector, a plurality of detection points 501 are set on a plurality of concentric circles with a center at a center position of each frame image, for example, as shown in FIG. 5. More specifically, a plurality of detection points 501 are set on each concentric circle so that another detection point can exist at a point-symmetrical position with respect to the center of the image for each detection point 501. A local motion vector is calculated for each detection point 501. The motion vector can be calculated by a known approach, such as template matching and a gradient method.

The left side in FIG. 5 shows a geometric conversion image I'(t−1) that is deformed through a geometric conversion, and the right side in FIG. 5 shows the current frame image I(t). An arrangement of the detection points of the motion vector in FIG. 5 is merely illustrative, and another arrangement may be adopted.

Next, four local coordinate conversion parameters a, b, c, and d in Equation 3 are calculated by using the local motion vector detected at each detection point 501. (x, y) is an arbitrary coordinate of the geometric conversion image I'(t−1), and (x', y') is a coordinate to which the coordinate (x, y) of the current frame image I(t) moves due to the local coordinate conversion parameters a, b, c, and d. Equation 3 indicates an affine conversion:

$$\begin{bmatrix} x' \\ y' \end{bmatrix} = \begin{bmatrix} a & b \\ -b & a \end{bmatrix} \begin{bmatrix} x \\ y \end{bmatrix} + \begin{bmatrix} c \\ d \end{bmatrix} \quad \text{EQUATION 3}$$

A calculation of the local coordinate conversion parameters a, b, c, and d uses a local movement vector at two detection points 501 that have a positional relationship of a point symmetry with respect to the center of the image. Equation 4 gives a local motion vector at a detection point 501 having a coordinate (x, y):

$$v_x(x,y) = (a-1)x + by + c$$

$$v_y(x,y) = -bx + (a-1)y + d \quad \text{EQUATION 4}$$

Equation 5 gives a local motion vector at a detection point (−x, −y) of a point symmetry of the coordinate (x, y):

$$v_x(-x,-y) = -(a-1)x - by + c$$

$$v_y(-x,-y) = bx - (a-1)y + d \quad \text{EQUATION 5}$$

$v_x$ and $v_y$ are x and y components of the local motion vector detected at each detection point 501.

From the above relational equations, the local coordinate conversion parameters a, b, c, and d in Equation 3 can be calculated as in the following Equation 6:

$$a = \frac{1}{2}\left[\frac{x}{x^2+y^2}\{v_x(x,y) - v_x(-x,-y)\} + \right. \quad \text{EQUATION 6}$$
$$\left. \frac{y}{x^2+y^2}\{v_y(x,y) - v_y(-x,-y)\}\right] + 1$$

$$b = \frac{1}{2}\left[\frac{y}{x^2+y^2}\{v_x(x,y) - v_x(-x,-y)\} + \right.$$
$$\left. \frac{x}{x^2+y^2}\{v_y(x,y) - v_y(-x,-y)\}\right]$$

$$c = \frac{1}{2}\{v_x(x,y) + v_x(-x,-y)\}$$

$$d = \frac{1}{2}\{v_y(x,y) + v_y(-x,-y)\}$$

The local coordinate conversion parameters are thus calculated with a combination of the detection points having a point symmetry relationship.

Figure 6:
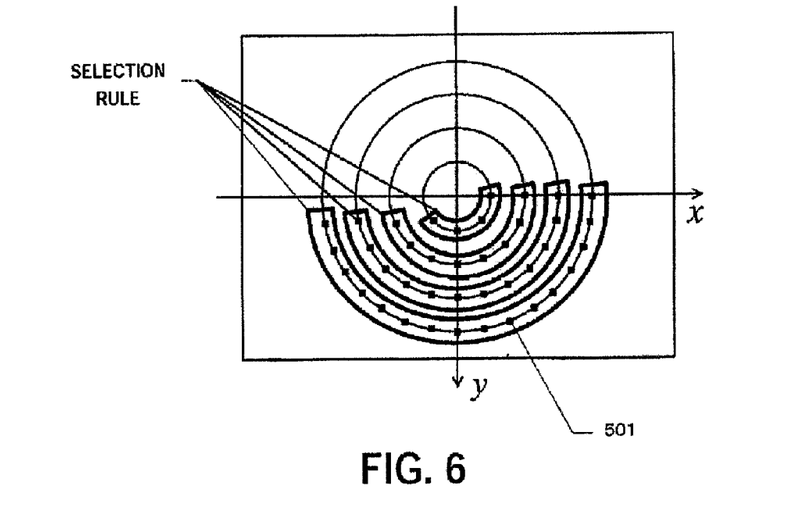
FIG. 6 is a view showing a selection rule in calculating a coordinate conversion parameter according to the first embodiment.

Next, the representative coordinate conversion parameter is calculated from the local coordinate conversion parameter. Initially, as shown in FIG. 6, a plurality of detection points 501 that are set on a plurality of concentric circles shown in FIG. 5 are classified into plural groups in accordance with a selection rule in which the same group includes only the detection points 501 of the same concentric circle, and a representative value of the local coordinate conversion parameter is calculated for each group. In order to calculate this representative value, a frequency distribution of the local coordinate conversion parameter on the concentric circle of the group is prepared, and a Gaussian function is convoluted to the frequency distribution, as shown in FIG. 7A.

Figure 7A:
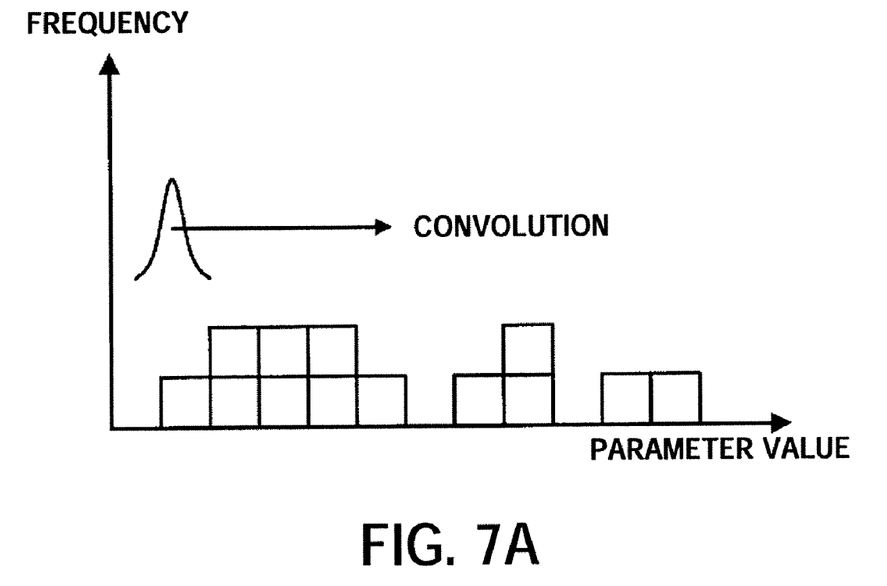
FIG. 7A is a view showing a convolution to a frequency distribution of a coordinate conversion parameter according to the first embodiment.
Figure 7B:
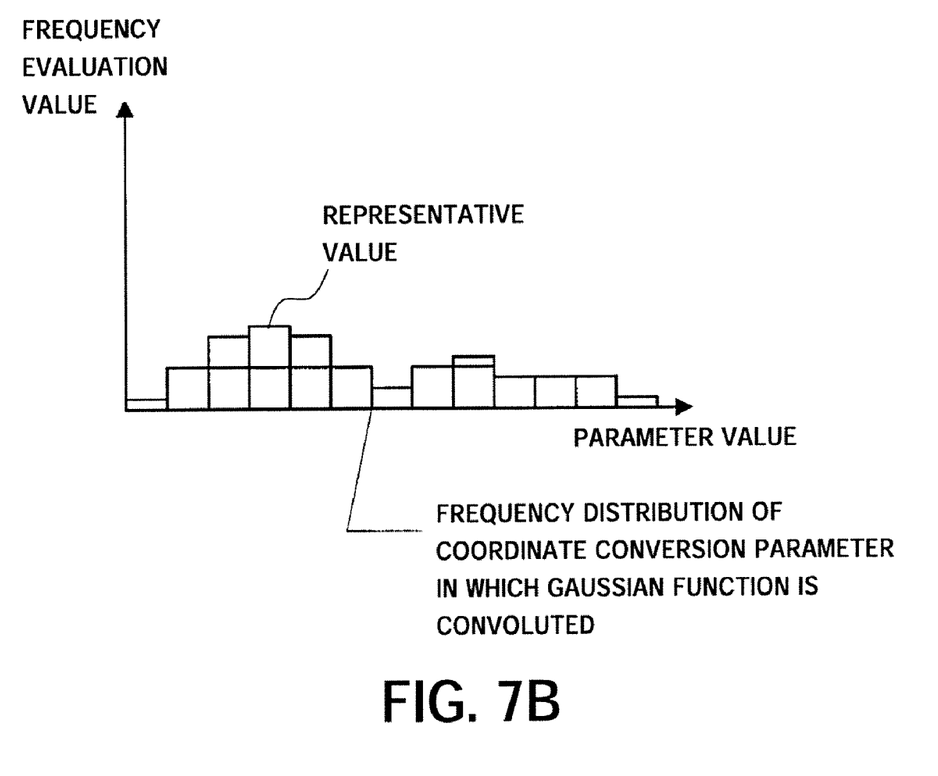
FIG. 7B is a view showing a result of the above convolution according to the first embodiment.

FIG. 7B schematically shows a frequency distribution obtained as a result of the convolution of the Gaussian function to the frequency distribution of the local coordinate conversion parameter shown in FIG. 7A. The maximum value in a frequency distribution at which the Gaussian function is convoluted is determined as a coordinate conversion parameter or a representative coordinate conversion parameter that represents the group.

A series of these processes smoothes the frequency distribution of the local coordinate conversion parameter; a value having a distribution around it is likely to be a maximum frequency value, and a precise representative value is calculated for each concentric circle. Similarly, a representative coordinate conversion parameter is determined for each group.

At last, each representative coordinate conversion parameter is properly weighed, and a system representative coordinate conversion parameter indicative of the coordinate conversion of the entire image is calculated. Since a motion vector indicative of fine enlargements, reductions, and rotations etc. can appear only at a periphery of the image, the weight may be made larger as a distance from the center of the image increases.

Thus, a coordinate conversion parameter (the system representative coordinate conversion parameter) is determined between the geometric conversion image I'(t−1) that is made by geometrically converting the previous frame image according to the rotational amount R detected by the motion detector 104, and the current frame image I(t).

Next, in the step S403, the image stabilization parameter calculation circuit 1102 provides a time series process used to calculate an image stabilization parameter for the deformation process of the current frame image I(t). In other words, an image stabilization parameter is calculated for each of the components including a pan, a tilt, a rotation around an optical axis, longitudinal and lateral translations, and a back-and-forth translation based on the rotational amount R from the motion detector 104 and the system representative coordinate conversion parameters (a, b, c, and d) between the geometric conversion image and the current frame image.

This embodiment assumes that a motion (vibration) that is a target of the image stabilization is a high frequency motion, and an intentional motion to be stored by a photographer is a low frequency. The image stabilization process applies a digital filtering process that uses a finite impulse response ("FIR"). In other words, this is a digital filtering process with a value of each of the components including a pan, a tilt, a rotation around an optical axis, longitudinal and lateral translations, and a back-and-forth translation, which are stored for a predetermined number of frames. Thereafter, a filtering result is compared with a storage value that has not undergone a filtering process, and image deformation parameters R', a', b', c', and d' to each component indicative of a difference in the comparison are calculated as image stabilization parameters. Thus, the calculation process of the image stabilization parameter ends.

Figure 3:
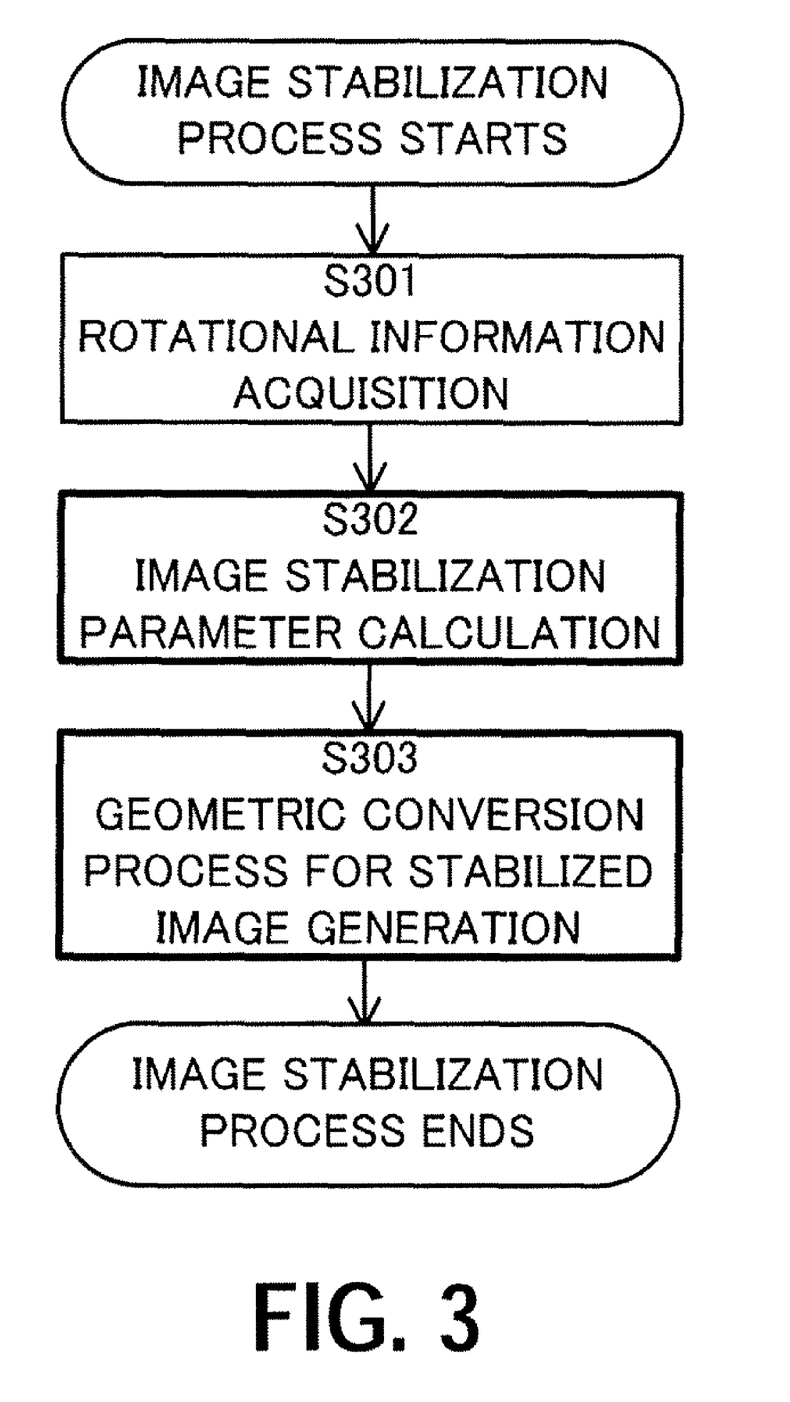
FIG. 3 is a flowchart showing an image stabilization process flow according to the first embodiment.

Next, the flow proceeds to the step S303 in the flowchart of FIG. 3, and the stabilized image generation circuit 1103 deforms the current frame image using the image stabilization parameter calculated by the step S302 (S403), and generates a stabilized image. More specifically, the current frame image I(t) is initially geometrically converted through Equation 3, and then the image stabilization parameters R', a', b', c', and d' are applied so as to obtain the current frame image (or stabilized image) which has undergone the image stabilization process through a reverse conversion of Equation 2. This process is applied to a sequentially generated frame image (the current frame image at that time), and a stabilized output motion picture image can be obtained.

In this embodiment, the motion detector 104 detects rotational motions of two degrees of freedom of panning and tilting, and the image stabilization parameter calculation circuit 1102 calculates coordinate conversion parameters relating to the rotational motion around the optical axis, and the longitudinal, lateral, and back-and-forth translations. Nevertheless, the motion detector 104 may detect rotational motions of three degrees of freedom of panning, tilting, and a rotation around the optical axis, and the image stabilization parameter calculation circuit 1102 may calculate coordinate conversion parameters relating to the longitudinal, lateral, and back-and-forth translations. This is true of the second embodiment.

As discussed above, this embodiment calculates a coordinate conversion parameter relating to a motion other than a motion corresponding to rotational information based on the current frame image and the geometric conversion image that is obtained by geometrically converting the previous frame image by using rotational information by the motion detector 104. In addition, this embodiment calculates the image stabilization parameter to different motions by using the coordinate conversion parameter and the rotational information by the motion detector 104. Thereby, images are stabilized for many motions of the camera 1. As a result, a well stabilized image can be obtained even in large and complicated motions such as imaging during walking.

Second Embodiment

Next follows a description of an embodiment of a camera that uses an ultra wide angle optical system, such as a fisheye lens, with a large geometric deformation that depends upon the optical system.

Figure 8:
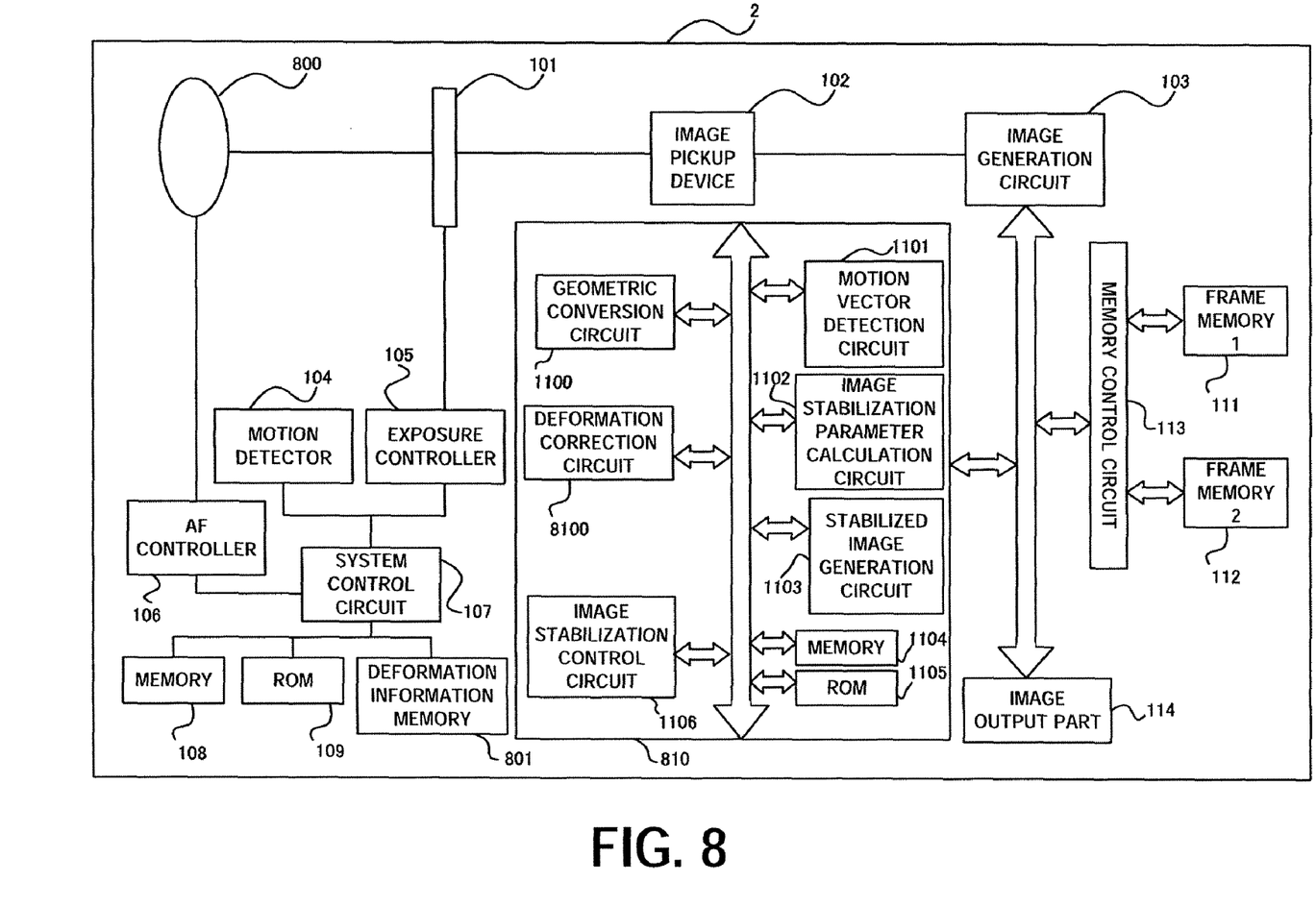
FIG. 8 is a block diagram showing a structure of a camera according to a second embodiment of the present invention.

This embodiment uses, for example, a camera 2 shown in FIG. 8.

Those elements in the camera 2 shown in FIG. 8 which are the same as corresponding elements in the camera 1 in the first embodiment (FIG. 1) will be designated by the same reference numerals, and a description thereof will be omitted.

In the camera 2, 800 is an image pickup lens constituted by a ultra wide angle optical system, such as a fisheye lens. 801 denotes a distortion information memory that stores geometric distortion information (simply referred to as "distortion information") of the image pickup lens 800 as the ultra wide angle optical system.

The image stabilization circuit 810 is provided with a distortion correction circuit (deformation reduction processor) 8100 in addition to the circuits 1100 to 1106 described in the first embodiment. The distortion correction circuit 8100 performs a deformation reduction process (referred to as "distortion correction process") that reduces an image deformation component corresponding to a geometric deformation that occurs in the image pickup lens 800.

Next follows a description of an operation of the camera 2 of this embodiment. A basic flow from taking a subject image to displaying an output image on the display or recording the output image in the recording medium through the image output part 114 is similar to that of the camera 1 of the first embodiment shown in FIG. 2, but the image stabilization process (image conversion process) is different from that of the first embodiment. Therefore, referring now to FIGS. 9 and 10, a description will be given of the image stabilization process of this embodiment.

Figure 9:
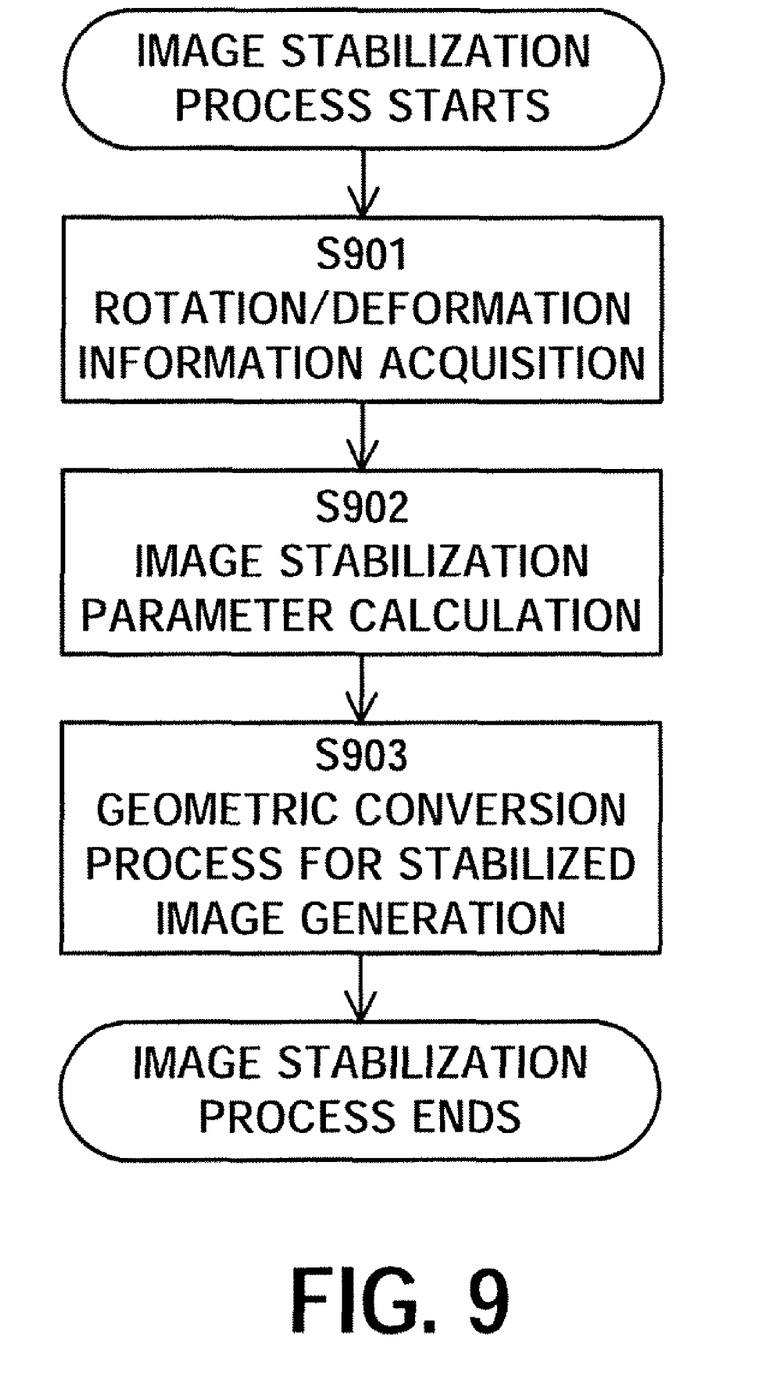
FIG. 9 is a flowchart showing an image stabilization process flow according to the second embodiment.

In FIG. 9, in the step S901, the image stabilization control circuit 1106 obtains rotational information of the camera 2 detected by the motion detector 104, and obtains distortion information of the image pickup lens 800 from the distortion information memory 801. The rotational information is the rotational amount (pitch angle and yaw angle) R from time at which the previous frame image is obtained and to time at which the current frame image is obtained, similar to the first embodiment.

Next, in the step S902, the image stabilization control circuit 1106 makes the distortion correction circuit 8100, the geometric conversion circuit 1100, the motion vector detection circuit 1101, and the image stabilization parameter calculation circuit 1102 calculate the image stabilization parameter between the previous frame image I(t−1) and the current frame image I(t). Referring to a flowchart of FIG. 10, a description will be given of a calculation process of the image stabilization parameter.

Figure 10:
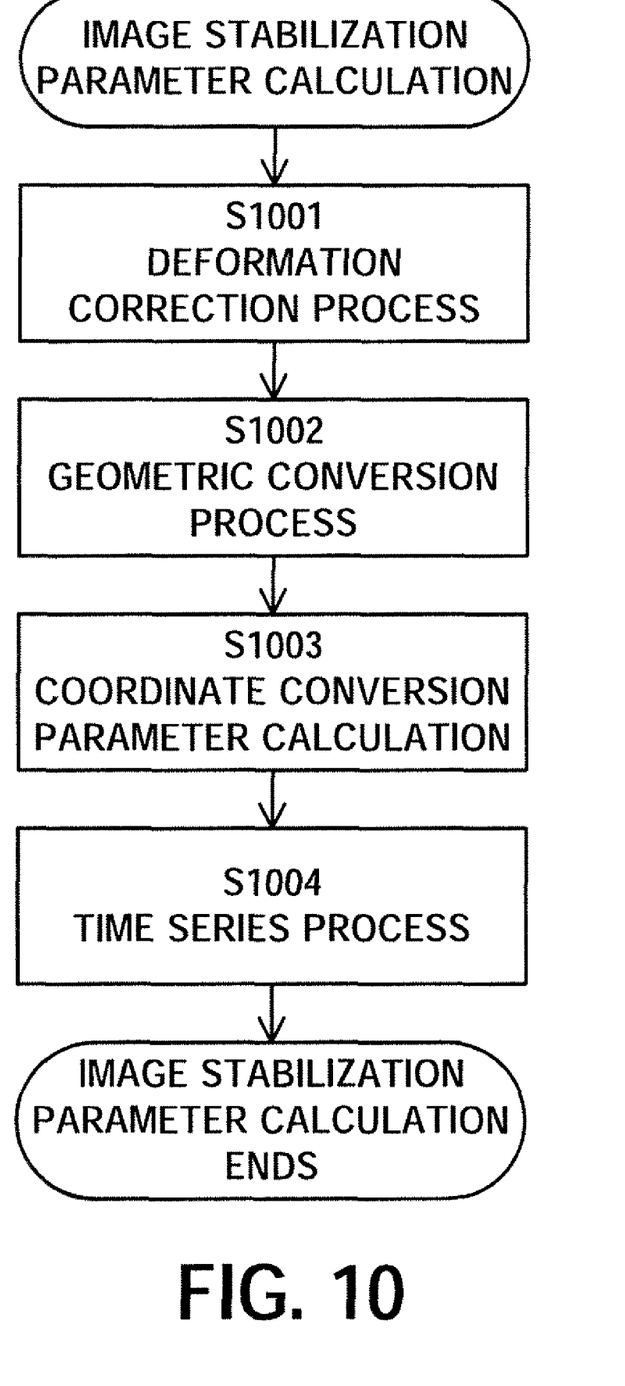
FIG. 10 is a flowchart showing an image stabilization parameter calculation process flow according to the second embodiment.

Initially, in the step S1001, the distortion correction circuit 8100 performs a distortion correction process of the previous frame image I(t−1) and the current frame image I(t), and obtains a previous frame image I'(t−1) and the current frame image I'(t) that are frame images that have undergone the distortion correction process.

A brief description will be given of the distortion correction process. Assume that (x0, y0) is an optical center coordinate corresponding to the optical axis position of the image pickup optical system, (x, y) is a coordinate in the frame image before the distortion correction process, and (x', y') is a coordinate in the frame image after the distortion correction process. In addition, when it is assumed that fdist(r) is a distortion amount to an image point r which is a distance from the optical center, the distortion correction process is performed in accordance with Equation 7 where $r=\sqrt{(x-x0)^2+(y-y0)^2}$ and $\alpha=\tan^{-1}\{(x-x0)/(y-y0)\}$:

$$x'=(r-fdist(r))\cos\alpha+x0$$

$$y'=(r-fdist(r))\sin\alpha+y0 \qquad \text{EQUATION 7}$$

fdist(r) is generally expressed as a polynomial, and coefficients of the polynomial are stored as distortion information in the distortion information memory 801.

The distortion correction process is not limited to the above Equation 7. For example, applicable methods include a method that provides a coordinate in a table format after the distortion correction process to a coordinate (x, y) in the frame image before the distortion correction process, and a method that utilizes a numerical equation for the distortion correction process based on the projection method of the optical system.

Next, in the step S1002, the geometric conversion circuit 1100 performs a geometric conversion process using the rotational amount R obtained by the motion detector 104 for the previous frame image I'(t−1) after the distortion correction, and obtains the geometric conversion image I''(t−1).

Next, in the step S1003, the motion vector detection circuit 1101 and the image stabilization parameter calculation circuit 1102 calculate the coordinate conversion parameter between the previous frame image I"(t−1) and the current frame image I'(t) that has not undergone the geometric conversion process after the distortion correction process. This calculation is performed similar to the first embodiment.

Next, in the step S1004, the image stabilization parameter calculation circuit 1102 performs the time series process to calculate the image stabilization parameter used for the deformation process of the current frame image I'(t) after the distortion correction process.

Next, the flow proceeds to the step S903, and the stabilized image generation circuit 1103 deforms the current frame image I'(t) after the distortion correction process using the image stabilization parameter calculated by the step S1004, and generates a stabilized image. This deformation process is performed similar to the first embodiment.

As discussed above, even in imaging with an ultra wide angle optical system, such as a fisheye optical system, images can be stabilized in many motions of the camera 2 by performing an image stabilization process similar to the first embodiment, with the previous and current frame images that have undergone the distortion correction process. As a result, a well stabilized image can be obtained with a wide angle of view even in large and complicated motions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298531, filed on Nov. 16, 2007, which is hereby incorporated by reference herein in its entirety.

What is claimed is:

1. An image capturing apparatus comprising:
   an image pickup system configured to take frame images including a past frame image and a current frame image;
   a shake detection sensor configured to detect a shake of the image capturing apparatus at the time of the current frame image, and thereby generate shake information that represents the shake, wherein the shake information includes a pitch direction component and a yaw direction component;
   a geometric converter configured to perform a geometric conversion process on the past frame image based on the shake information to obtain a geometric conversion image;
   a motion vector detector configured to detect a motion vector between the geometric conversion image and the current frame image that has not undergone the geometric conversion process, wherein the motion vector includes shake components except the pitch and yaw direction components;
   an image stabilization parameter calculator configured to calculate an image stabilization parameter for motion information by using the shake information and the motion vector; and
   a stabilized image generator configured to generate a stabilized image through a deformation process to the current frame image or a frame image generated subsequent to the current frame image by utilizing the image stabilization parameter.

2. The image capturing apparatus according to claim 1, wherein the image stabilization parameter calculator calculates the image stabilization parameter to a rotation by using the shake information, and the image stabilization parameter to a translation by using the motion vector.

3. An image processing method of controlling an image capturing apparatus which comprises an image pickup system configured to take frame images including a past frame image and a current frame image, the method comprising:
   detecting a shake of the image capturing apparatus at the time of the current frame image by a shake detection sensor, and thereby generating shake information that represents the shake, wherein the shake information includes a pitch direction component and a yaw direction component;
   performing a geometric conversion process on the past frame image based on the shake information to obtain a geometric conversion image;
   detecting a motion vector between the geometric conversion image and the current frame image that has not undergone the geometric conversion process, wherein the motion vector includes shake components except the pitch and yaw direction components;
   calculating an image stabilization parameter for motion information by using the shake information and the motion vector; and
   generating a stabilized image through a deformation process to the current frame image or a frame image generated subsequent to the current frame image by utilizing the image stabilization parameter.

4. An image capturing apparatus comprising:
   an image pickup system configured to take frame images including a past frame image and a current frame image;
   a shake detection sensor configured to detect a shake of the image capturing apparatus at the time of the current frame image and thereby generate shake information that represents the shake, wherein the shake information includes a pitch direction component and a yaw direction component;
   a memory for storing an image distortion component corresponding to a geometric distortion that occurs by an optical system used for imaging;
   a distortion reducer configured to provide a distortion reduction process that reduces an image distortion component in the past frame image and the current frame image based on the image distortion component stored in the memory;
   a geometric converter configured to perform a geometric conversion process on the past frame image that has already undergone the distortion reduction process based on the shake information to obtain a geometric conversion image;
   a motion vector detector configured to detect a motion vector between the past frame image that has undergone both the distortion reduction process and the geometric conversion process and the current frame image that has undergone the distortion reduction process and has not undergone the geometric conversion process, wherein the motion vector includes shake components except the pitch and yaw direction components;
   an image stabilization parameter calculator configured to calculate an image stabilization parameter for motion information by using the shake information and the motion vector; and
   a stabilized image generator configured to generate a stabilized image through a deformation process to the current frame image that has undergone the distortion reduction process and has not undergone the geometric conversion process or to a frame image generated subsequent to the current frame image by utilizing the image stabilization parameter.

* * * * *